June 5, 1923.
F. LAWACZECK ET AL
1,457,629
APPARATUS FOR BALANCING MACHINERY
Filed Dec. 22, 1917
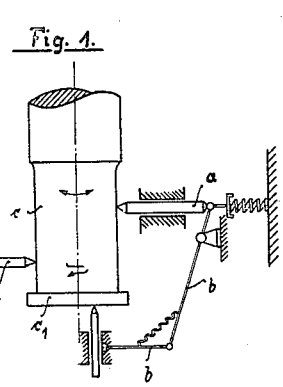
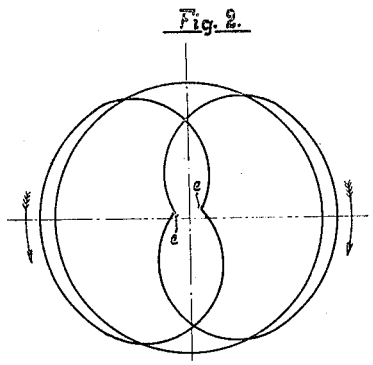
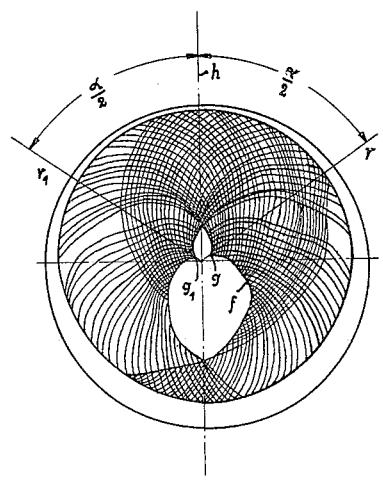
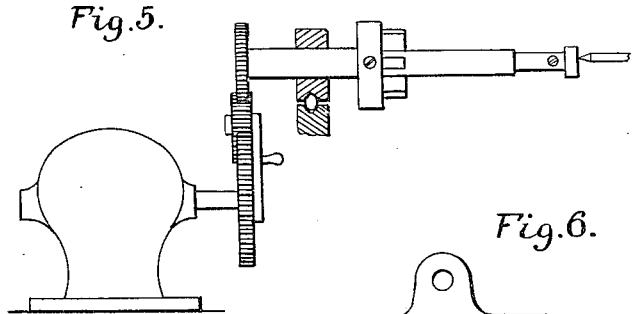
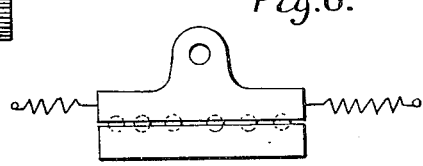
INVENTOR:
FRANZ LAWACZECK
HANS HEYMANN
BY: 
ATTORNEY.

Patented June 5, 1923.

UNITED STATES PATENT OFFICE.

FRANZ LAWACZECK, OF HALLE-ON-THE-SAALE, AND HANS HEYMANN, OF DARMSTADT, GERMANY.

APPARATUS FOR BALANCING MACHINERY.

Application filed December 22, 1917. Serial No. 208,515.

*To all whom it may concern:*

Be it known that we, FRANZ LAWACZECK, a subject of the German Empire, residing at Halle-on-the-Saale, Germany, and HANS HEYMANN, a subject of the German Empire, residing at Darmstadt, Germany, have invented certain new and useful Improvements in Apparatus for Balancing Machinery, of which the following is a specification.

The greatest difficulty in the practical use of apparatus which serve for the dynamic balancing of rotating parts of machinery, consists in determining the position of the socalled plane of unbalancing or overbalancing, i. e. of that axial plane in which the center of gravity of the mass of the entire body lies outside of the axis of rotation; or in which the couple acts, which results from several forces of mass of partial centers of gravity displaced to each other, that arise during the rotation of the body.

As is known, the scientific method of balancing is as follows: The body to be balanced is laid into a frame which, in any one plane, permits oscillations that are damped by means of elastic forces. When the body is then rotated those forces of mass, overbalance or unbalance impulses as they are commonly called, acting in one of its axial planes, will impart an impulse of oscillation to the body, whenever their plane approaches that in which the frame can oscillate. According to the size of the existing kinetic mass, these oscillations will cause greater or lesser deflections of the pendular system. When the number of revolutions of the body, which is at the same time the number of revolutions of the force of unbalance acting upon it, come into resonance with the number of oscillations of the whole oscillating system the impulses are magnified to an extraordinary degree—theoretically they should become infinitely great—so that in this condition of resonance even very small balancing forces can be made distinctly noticeable by their deflections. Upon these facts mainly rests the great sensitiveness of this dynamic method of balancing.

The condition of resonance is used at the same time to determine the position, on the body, of that plane in which the forces of unbalance act. For according to the theory of such damped oscillations, there exists a definite relation between the position of the plane of unbalance and of the plane determined by that point of the rotating body which causes the greatest deflection in the plane of free oscillation. The angle between both planes measures, below the rotation of resonance, 0° and rapidly grows, in the neighborhood of the resonance to 90°, while it measures 180° above the resonance. Thereby the plane of unbalancing precedes the oscillations in the direction of rotation and the jump from 0° over 90° to 180° is accomplished the more rapidly the lesser the damp i. e. the more sensitively the whole apparatus operates. This angle between the plane of the greatest deflection is called phase-displacement.

One then tries, according to various methods, to designate that part of the oscillating and rotating body that has the greatest deflection. If this can be accomplished exactly at the socalled resonance speed then the plane of unbalancing must be exactly 90° ahead of the designated plane of deflection taken in the direction of rotation. These marks can be made upon the rotating body with colored pencils or chalks that, from the side, are approached to some convenient point of the body. But it is more practical to employ an apparatus as shown in Fig. 1, of the drawings affixed to this specification and forming part thereof and in which—

Fig. 1 shows, in a purely diagrammatic manner and by way of example, how the pencil is operated by the shaft of the body to be balanced, while Fig. 2 discloses a diagram of curves obtained in this manner on the end face of the shaft, Fig. 3 being a similar view of all the curves obtained, Fig. 4 a diagrammatic view of a device for recording the oscillations of the shaft, and Figs. 5 and 6 showing means for holding and rotating, respectively, the article to be balanced.

Referring to the drawings, Fig. 1 shows an apparatus, which marks the deflections directly and automatically upon the head surface $c_1$ of the rotating and oscillating shaft by means of a piston $a$, propelled from the rotating shaft whereby a mechanism may be used that magnifies the deflection.

Extended experiments with apparatus of this kind have shown that such marks indicate the position of the plane of unbalancing only very inaccurately. For it is nearly impossible to accomplish the marking of the deflection upon the rotating body exactly at the moment of the number of revolutions of resonance because it is extraordinarily difficult, in fact almost impossible, to adjust the number of revolutions of the body exactly to this condition. This is due to the fact that the speed of rotation in the neighborhood of the resonance is to a very great degree subject to the influence of the forces of mass and for that reason is itself very variable. With the speed of rotation, as has already been outlined, the phase displacement between the plane of unbalancing and that of the greatest oscillation, changes very suddenly. Therefore in marking the deflection it is as rarely possible to strike the exact number of revolutions of unbalance as the phase angle of 90°. It is possible only to determine the approximate limits, never the exact position of the plane of unbalancing.

These difficulties are entirely overcome by the present invention by the fact that the body to be balanced is brought up to a number of revolutions greater than the number of revolutions of unbalancing of the oscillating system and that then the oscillations produced by the slowing down of the system completely left to itself are automatically registered. For this purpose there is provided between the body to be balanced and the driving gear a clutch that can be disengaged; after the body has been brought to a number of revolutions above the revolutions of resonance it is disengaged from the driving mechanism. While the body is thus left entirely to itself the number of revolutions decreases gradually, according to a definite law, as a result of the existing resistances especially of the friction. As soon as the number of revolutions again approaches the speed of resonance the oscillating frame in which the body is carried, begins to oscillate. While now the number of revolutions of its own accord gradually slows down through the area of resonance, the oscillations of the system are continuously automatically registered upon the face of the shaft. At each separate revolution the oscillation each time effects a curving out, $e$, of the diagram (com. Figure 2).

Corresponding to the continually changing phase displacement the separate curves of deflection now lay themselves next to each other. In this manner a group of curves is formed the enveloping curve of which on its part forms a continuous curve $f$ (Fig. 4). This enveloping curve always remains identical, if the body is left to itself in the manner described above while running out, because the resisting friction in the bearings and the like exerts a steady action, provided other outside forces not constant in their influence, such as motor or belt drive etc., are kept away. The greatest deflection to appear at all makes itself clearly noticeable in the diagram of Fig. 4 as a point $g$ which is the sharper the more the stroke of the marking pencil approaches the middle of the diagram. If the body is rotated in the opposite direction, there naturally is produced a similar curve, which lies exactly symmetrical to the first, if the damping of the moment of torsion is the same for both directions of rotation. This is the case for most bodies to be balanced. Under this assumption the bisecting line $h\ h$ of the angle $d$ which is formed by the two radii $r\ r$, running through the point $g\ g_1$, determines with great accuracy the desired plane of unbalancing which is thus immediately found by the first diagram. The conditions for this determination are indeed given in the present invention because the body to be balanced is left entirely to itself, without the necessity of keeping to an exactly determined number of revolutions, at which the deflections of the oscillating system would have to be registered. If the damping for the two directions of rotation is different, as for example in the balancing of fan-blades, steam turbine wheels etc. the group of curves marked for one direction of rotation will always be differentiated from that of other direction of rotation by its size. Therefore, not the bisecting angle $\frac{\alpha}{2}$ between the radii $r\ r$, or, what is proved to be just as dependable, the line of symmetry of the approximately 8-shaped surfaces formed and enveloped by the two groups of curves, determines the position of the plane of unbalancing but rather this plane is always shifted about the same angle in one direction of rotation.

In order to correct this error and in general when inserting the balance weights to verify even more accurately the position of the plane of unbalancing which must be transferred from the diagram on to the body itself to be balanced the arrangement described above may be supplemented as follows:

The absolute magnitude of the oscillation is drawn upon a non-rotating surface and preferably in a much magnified scale by means of a special apparatus as outlined in Fig. 4. In the apparatus here shown the oscillation of the shaft $c$ is transferred by means of a groping rod $i$, or something similar, onto a lever with very unequal arms the indicator of which $k_1$ marks the oscillations on a magnified scale on to a writing surface $l$. It is best to place this register $l$ perpendicularly adjustable to the direction of register so as to keep the oscillations easily comparable lying one below the other.

When now a balance weight has been placed in the plane of unbalancing determined in the manner above described, the oscillation still remaining will doubtless be smallest then when the weight is moved exactly into the plane of unbalancing. Even with a small deviation of the position of the balancing weight out of the plane of the kinetic mass the deflections of the oscillating system will again increase. If, therefore, the direction, which as described above, resulting in the balancing bodies with different dampings in both directions of rotation, should not coincide exactly with the position of the plane of unbalancing, this can easily be determined by moving the balancing weight in a very small angle, and holding it in that position in which the very smallest deflection of the oscillating system exists. Also the marking according to Fig. 4 is automatic, while the rotating body is running out. Only in this manner is it possible to make an exact comparison between the deflections of oscillation, because only in this manner all outside disturbances the influence of which cannot be followed up are eliminated.

This balancing of the body during the slowing down permits of a balancing of the kinetic masses to a degree of accuracy which in the hitherto employed methods of balancing could be attained either not at all or only after seeking experiments entailing much work.

When in the matter described above the exact position of the plane of unbalancing has been determined, balancing weights of various size can be arranged in this plane until the deflections appearing in the state of resonance have attained the smallest value still discernible by means of the apparatus for marking. Since, through the use of the resonance, even very small kinetic masses cause noticeable deflections, the sensitiveness of the balancing can by these means, be increased to the utmost degree. The essential point is that the number of rotations of the system be always brought above the number of revolutions of resonance and then be left entirely to itself while slowing down. In this manner it is possible to notice sensitiveness of the value 1/10 g.; at the same time shiftings of the center of gravity of the body to be balanced of the value of 4/10000 of an inch are still noticeable. By means of this invention it is possible to make use of the accuracy of the dynamic balancing apparatus to an almost unlimited degree.

We claim:

1. Apparatus for balancing rotary parts of machinery and for determining the plane of unbalancing, comprising in combination means for holding the part to be balanced, said means being adapted to oscillate mainly in a plane during the process of balancing, driving means for causing the body to be balanced to rotate at a speed above the speed of resonance of the oscillating system and for subsequently allowing said system to run by inertia and means for automatically recording the extent of vibrations occurring with the slowing down, particularly at the speed of resonance.

2. Apparatus for balancing rotary parts of machinery and for determining the plane of unbalancing, comprising in combination means for holding the part to be balanced, said means being adapted to oscillate mainly in a plane during the process of balancing, driving means for causing the body to be balanced to rotate at a speed above the speed of resonance of the oscillating system and means for subsequently uncoupling said driving means and allowing said system to run by inertia, means for automatically recording on the body to be balanced the extent of vibrations occurring with the slowing-down, particularly at the speed of resonance, and means for recording upon a non-rotating recording surface that is preferably movable in a plane perpendicular to the record, the deflections produced by angularly displacing in the region of the plane of unbalancing a balance weight disposed on the body to be balanced.

3. Apparatus for balancing rotary parts of machinery and for determining the plane of unbalancing, comprising in combination means for holding the part to be balanced, said means being adapted to oscillate mainly in a plane during the process of balancing, means for causing the body to be balanced to rotate at a speed above the speed of resonance of the oscillating system and for subsequently allowing said system to run by inertia, means for automatically recording on the body to be balanced the extent of vibrations occurring with the slowing-down, particularly at the speed of resonance, means for recording upon a non-rotating recording surface that is preferably movable in a plane perpendicular to the record, the deflections produced by angularly displacing in the region of the plane of unbalancing a balance weight disposed on the body to be balanced and means, adapted to be moved by said oscillating system, for impelling both said recording means.

4. Apparatus for balancing rotary parts of machinery and for determining the plane of unbalancing, comprising in combination means for holding the part to be balanced, said means being adapted to oscillate mainly in a plane during the process of balancing, means for causing the body to be balanced to rotate at a speed above the speed of resonance of the oscillating system and for subsequently allowing said system to run by inertia, means for automatically recording on the body to be balanced the extent of vibrations occurring with the slowing-down, particularly at the speed of resonance, means for recording upon a non-rotating recording surface that is preferably movable in a plane perpendicular to the record, the deflections produced by angularly displacing in the region of the plane of unbalancing a balance weight disposed on the body to be balanced and a piston in contact with the body to be balanced and capable of transmitting the oscillating movements thereof onto both said recording means.

In testimony whereof we affix our signatures.

DR. ING. FRANZ LAWACZECK.
ING. HANS HEYMANN.